April 28, 1931.                C. H. O. LÜBECK                1,802,435
ELECTRODE FOR ELECTRIC ACCUMULATORS AND METHOD OF MANUFACTURING SAME
            Filed Oct. 21, 1925            2 Sheets-Sheet 1
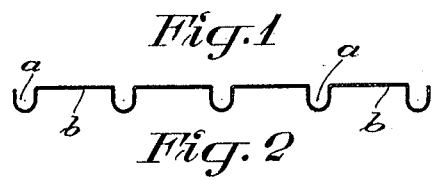
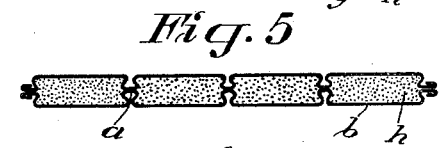
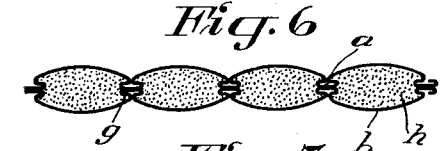
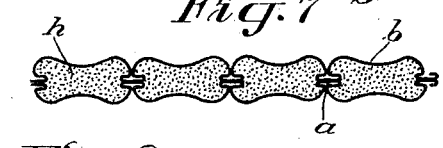
C. H. O. Lubeck
INVENTOR
By: Marks and Clerk
Attys April 28, 1931. C. H. O. LÜBECK 1,802,435
ELECTRODE FOR ELECTRIC ACCUMULATORS AND METHOD OF MANUFACTURING SAME
Filed Oct. 21, 1925
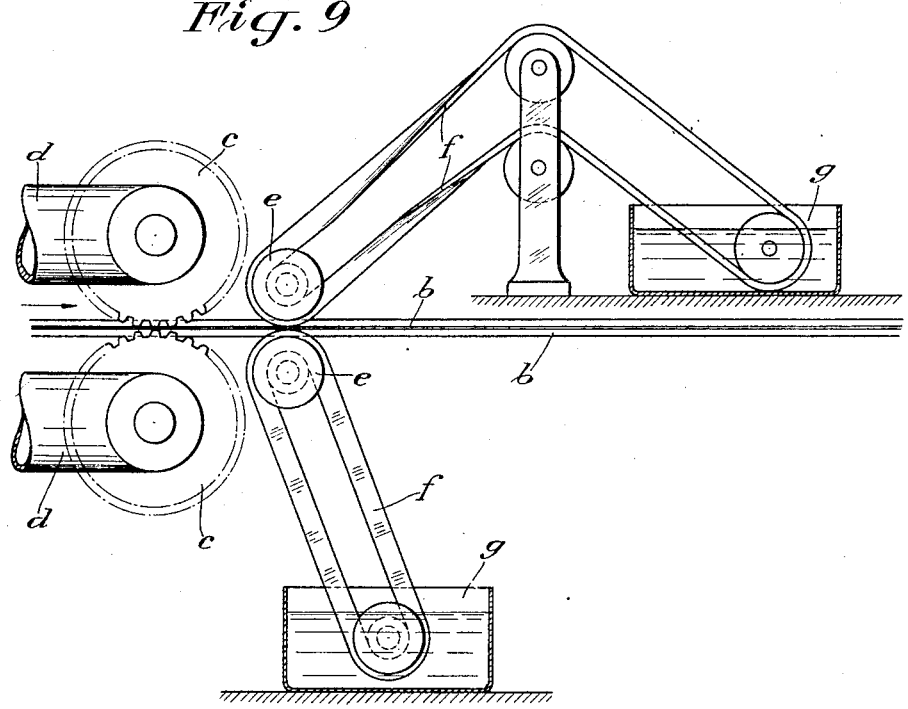
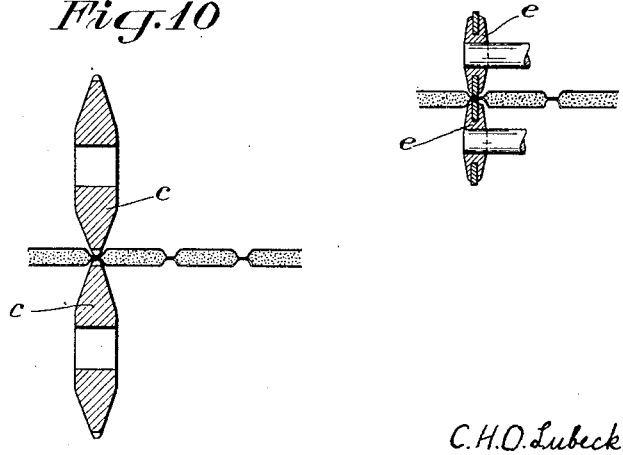
C.H.O.Lubeck,
INVENTOR
By: Marks and Clerk
Attys Patented Apr. 28, 1931

1,802,435

UNITED STATES PATENT OFFICE

CARL HILDING OSSIAN LÜBECK, OF STOCKHOLM, SWEDEN

ELECTRODE FOR ELECTRIC ACCUMULATORS AND METHOD OF MANUFACTURING SAME

Application filed October 21, 1925, Serial No. 63,983, and in Sweden November 1, 1924.

This invention relates to electric accumulators of the kind having the active mass of the electrodes enclosed between perforated thin sheet-metal plates, for instance sheet-nickel or sheet-iron or nickel-plated iron.

The invention consists substantially in this that one or, if desired, both of the above mentioned plates, between which the active mass of the electrode is enclosed, are provided with depressions, for instance in the shape of longitudinal channels, the bottoms of which bear against the other plate or, if desired, against the bottoms of corresponding depressions made in said other plate, and that the plates having the active mass between them are connected with each other at the contact places. An electrode according to the invention is manufactured in such manner that depressions are made in the one plate, if said depressions consist of longitudinal channels preferably by rolling, and then the active mass, for instance in the shape of cakes, is introduced into the pockets formed between said depressions in the plate, whereupon a second plate with or without depressions is placed with the outside of the bottoms of the depressions resting against the outside of the bottoms of the depressions in the first mentioned plate, and finally the two plates having the active mass between them are connected with each other at the contact places.

Further characteristic features of the invention will be described below in connection with the description of certain forms of embodiment shown in the annexed drawings.

In the drawings, Fig. 1 shows a plate having channels rolled therein, and Figs. 2 and 3 show the connection of said plate with another similar plate and with a plane plate, respectively. Figs. 4 to 7 show cross-sections of four different forms of embodiment or different steps of manufacturing such plates. Fig. 8 shows on a less scale a side view of a ready-made electrode. Fig. 9 shows diagrammatically an apparatus for welding together the electrode plates, and Figs. 10 and 11 show sections of details of said apparatus.

In Fig. 1, $a$ designates longitudinal channels rolled into a previously plane extended strip or band $b$ of thin sheet-metal having a width corresponding to the width of the ready-made electrode, said band being perforated either before or after the impression of the channels $a$.

After the depressions, in the present case the channels $a$, have been made in the plate, said plate is applied to another similar plate, so that the outer sides of the bottoms of the channels $a$, which have preferably, a semicircular cross-section, will bear against each other, as apparent from Fig. 2. The electrode mass is thereby applied preferably before or simultaneously with the application of the plates, and then the said plates are connected to each other at the bottoms of the channels, for instance by point- or line-welding, or, if desired, by stitching or sewing with metal wire. Instead of the application of two plates, obviously a single plate having the double width can be bent, so that the bottoms of the channels will meet with each other, and then the connection is performed. In certain cases it may be suitable to apply a plate having channels to a plane plate, as shown in Fig. 3, and to connect said plates in the manner set forth above.

Fig. 9 shows diagrammatically an apparatus for connecting the plates to each other by welding. The plates $b$ laid the one upon the other are guided between two rotary disks $c$, $c$, consisting for instance of copper and connected to a source of current by means of the conductors $d$, $d$. The said disks $c$, $c$ enter into the previously mentioned channels $a$ of the plates, which are thereby welded together in known manner. The edge of the disks $c$, $c$ may be toothed, as shown in the figure, in which case a point-welding is obtained, or uninterrupted and smooth, if line-welding be desired.

Instead of a continuously running channel the plates may, for instance, be provided with circular depressions located at a certain distance corresponding to the distance between the teeth of the disks $c$, $c$, a welding together of the plates being thereby obtained at each depression or pair of abutting depressions.

After the plates have passed through the welding disks c, c, the joint is introduced between two further disks e, e, by means of which two endless welted felt bands f are pressed against the joint, so as to cool it. The said felt bands are led, if desired, over guide rolls, as shown in the figure, through water bath g, g, where they are cooled and become wet, and then they run back to the joint.

Fig. 10 shows a section through the disks c, c, illustrating the location of said disks with relation to the electrode plates, and Fig. 11 shows a section through the disks e, e and the felt band. As apparent from said last mentioned figure, the said felt band is caused by said disks to enter edgewise into the channels. When the band leaves the said disks, it is preferably led, with the flat sides contacting against other rollers, through the cooling bath.

After the connection of the plates the electrode blank thus obtained is further worked upon, for instance by repeated rolling, so that the desired profile of the electrode is obtained. In Figs. 4 to 7 there are shown in profile different steps of manufacturing the electrode blank. Any one of those steps may also, if desired, form the finishing step of the manufacture of the electrode.

As apparent from the said figures, the electrodes will be divided into a number of chambers or pockets h containing the active mass. The said pockets are separated from each other by the partitions i formed by the chanenls a depressed into the plates.

After the desired profile has been imparted to the electrode blanks by rolling, the said blanks are cut into pieces having a length corresponding to the length or height, respectively, of the electrode and are closed at the ends and provided with suitable contact tongues, so as to provide for connections between the several electrodes and bus bars and terminals, respectively. An electrode manufactured in the above described manner is shown in Fig. 8, illustrating a side view thereof.

What I claim as new and desire to secure by Letters Patent of the United States of America is:—

1. A method of manufacturing electrodes for storage batteries which consists in rolling a perforated sheet metal band so as to form longitudinal rows of depressions on one side thereof, applying active material in the form of strips longitudinally on the backside of said band between the projections formed by said depressions, covering the backside by a second perforated sheet metal band adapted to bear against said projections, joining together the two bands at the points of contact of the projections with the opposite band, cutting the band formed electrode blank thus formed into pieces of suitable length corresponding to that of the electrodes, and closing up the ends of the pieces.

2. A method of manufacturing electrodes for storage batteries which consists in rolling a perforated sheet metal band having substantially the same width as the electrodes to be produced so as to form longitudinal rows of depressions on one side thereof, applying active material in the form of strips longitudinally on the backside of said band between the projections formed by said depressions, associating with said band a second sheet metal band so as to bear against one another at said projections, joining together the bands so associated successively at the points of contact of said projections with the opposite band, cutting the band formed electrode blank thus formed into pieces of suitable length corresponding to that of the electrodes, and closing up the ends of the pieces.

3. A method of manufacturing electrodes for storage batteries which consists in rolling a perforated sheet metal band having substantially the same width as the electrodes to be produced so as to form longitudinal rows of depressions on one side thereof, applying active material in the form of strips longitudinally on the backside of said band between the projections formed by said depressions, rolling a second perforated sheet metal band so as to form therein depressions corresponding to those of the band first mentioned, associating the two bands so as to cause the projections formed on the backside of one band by the depressions therein to bear against the corresponding projections on the other band, joining together the two bands at the points of the contact, cutting the band formed electrode blank thus formed into pieces of suitable length corresponding to that of the electrodes, and closing up the ends of the pieces.

4. A method of manufacturing electrodes for storage batteries which consists in rolling a perforated sheet metal band so as to form longitudinal rows of depressions on one side thereof, applying active material in the form of strips longitudinally on the backside of said band between the projections formed by said depressions, covering the backside by a second perforated sheet metal band adapted to bear against said projections, joining together the two bands at the points of contact of the projections with the opposite band, rolling the band formed electrode blank thus formed so as to produce the desired cross section of the electrodes, cutting the electrode blank into pieces of suitable length corresponding to that of the electrodes, and closing up the ends of the pieces.

5. A method of manufacturing electrodes for storage batteries which consists in rolling a perforated sheet metal band so as to form longitudinal rows of depressions on one side thereof, applying active material in the form of strips longitudinally on the backside of said band between the projections formed by said depressions, covering the backside by a second perforated sheet metal band adapted to bear against said projections, joining together the two bands at the points of contact of the projections with the opposite band, rolling the band formed electrode blank thus formed so as to establish substantially plain and continuous active surfaces on both sides of the blank, cutting the electrode blank into pieces of suitable length corresponding to that of the electrodes, and closing up the ends of the pieces.

6. A method of manufacturing electrodes for storage batteries which consists of rolling a perforated sheet metal band having substantially the same width as the electrodes to be produced so as to form longitudinal rows of depressions on one side thereof, applying active material longitudinally of the back side of said band between the projections formed by said depressions, associating with said band a second sheet metal band so as to abut against one another at said projections, welding together the bands thus associated successively at points of contact, cutting the band formed electrode thus formed into pieces of suitable length corresponding to that of the electrodes, and closing up the ends of the pieces.

In testimony whereof I affix my signature.

CARL HILDING OSSIAN LÜBECK.